(12) United States Patent
Imai et al.

(10) Patent No.: US 10,108,293 B2
(45) Date of Patent: Oct. 23, 2018

(54) TOUCH-TYPE INPUT DEVICE

(71) Applicant: KABUSHIKI KAISHA TOKAI RIKA DENKI SEISAKUSHO, Aichi (JP)

(72) Inventors: Takao Imai, Aichi (JP); Yuji Takai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 7 days.

(21) Appl. No.: 15/357,038

(22) Filed: Nov. 21, 2016

(65) Prior Publication Data

US 2017/0168639 A1   Jun. 15, 2017

(30) Foreign Application Priority Data

Dec. 14, 2015 (JP) ................................ 2015-243474

(51) Int. Cl.
 *G06F 3/041* (2006.01)
 *G06F 3/044* (2006.01)
 *B60K 37/04* (2006.01)

(52) U.S. Cl.
 CPC ............ *G06F 3/0416* (2013.01); *G06F 3/044* (2013.01); *B60K 37/04* (2013.01)

(58) Field of Classification Search
 CPC ........ G06F 3/0416; G06F 3/044; B60K 37/04
 See application file for complete search history.

(56) References Cited

U.S. PATENT DOCUMENTS

| 9,939,957 | B2 * | 4/2018 | Chiang ................ G06F 3/0418 |
| 2010/0321336 | A1 | 12/2010 | Chou et al. |
| 2011/0141047 | A1 | 6/2011 | Iwaizumi et al. |
| 2013/0038573 | A1 | 2/2013 | Chang et al. |
| 2014/0146008 | A1 * | 5/2014 | Miyahara ................ G06F 3/044 |
| | | | 345/174 |
| 2014/0160038 | A1 * | 6/2014 | Lee ........................ G06F 3/0418 |
| | | | 345/173 |
| 2014/0218333 | A1 * | 8/2014 | Wang ...................... G06F 3/044 |
| | | | 345/174 |
| 2015/0153870 | A1 | 6/2015 | Lee et al. |
| 2015/0242007 | A1 | 8/2015 | Iwaizumi et al. |

FOREIGN PATENT DOCUMENTS

JP   2010-009321   1/2010

OTHER PUBLICATIONS

Extended European Search Report for EP 16201049.0 dated Apr. 18, 2017.

* cited by examiner

*Primary Examiner* — Mihir K Rayan
(74) *Attorney, Agent, or Firm* — Greenblum & Bernstein, P.L.C.

(57) ABSTRACT

A controller of a touch-type input device updates baselines when capacitances of capacitors of a touch panel all remain within a predetermined capacitance range over a predetermined period.

7 Claims, 5 Drawing Sheets

<Baseline Updating Condition Satisfaction Determination Process>

TOUCH-TYPE INPUT DEVICE

CROSS-REFERENCE TO RELATED APPLICATIONS

This application is based upon and claims the benefit of priority from prior Japanese Patent Application No. 2015-243474, filed on Dec. 14, 2015, the entire contents of which are incorporated herein by reference.

FIELD

The present disclosure relates to a touch-type input device.

BACKGROUND

A conventional touch-type input device is configured so that a user can touch a touch panel to move a mouse pointer on a display and/or select a functional item on the display (refer to, for example, Japanese Laid-Open Patent Publication No. 2010-9321). Recent touch-type input devices are configured to detect, for example, tapping, flicking, and swiping of a touch panel. Flicking corresponds to a particular function such as the scrolling of a screen on the display in the direction flicking is performed. The same applies to swiping.

A touch-type input device of a projected capacitive type includes a plurality of drive electrodes and a plurality of detection electrodes that form a grid sensor pattern. Capacitors are formed at the intersections of the grid of the sensor pattern. The touch-type input device detects touching based on the capacitance of each of the capacitors. A touch-type input device of a mutual capacitive type, which is one example of the projected capacitive type, is configured to detect changes in the capacitance of each capacitor of the sensor pattern and is thus capable of simultaneously detecting multiple touched positions.

SUMMARY

A touch-type input device of a capacitive type uses a baseline to distinguish the capacitance resulting from a touch from the capacitance resulting from the ambient environment (parasitic capacitance and temperature). For example, when the detected capacitance is larger than the baseline and when the amount of change in the detected capacitance (for example, difference between detected capacitance and baseline) is larger than a threshold value, the touch-type input device determines that a finger has touched or approached the touch panel (referred to as touch detection or approach detection).

There are touch-type input devices that are applicable to changes in the temperature and/or humidity by gradually increasing or decreasing (that is, updating) the baseline in accordance with gradual changes in the temperature and/or humidity.

When a touch-type input device of a capacitance type is used in a vehicle, the temperature range of the ambient environment is broad. Thus, changes in the capacitance (parasitic capacitance) resulting from temperature changes are relatively large. Further, changes in the capacitance (parasitic capacitance) resulting from wear of the film or the like forming the panel surface (detection surface) of a touch panel are relatively large. Thus, a touch-type input device may be configured to obtain a new baseline whenever activated (for example, whenever vehicle shifts to an ACC ON state).

To avoid erroneous correction of a finger state, the updating of the baseline when the temperature and/or humidity changes is not performed when a finger is on the touch panel (touch-on). However, when there is a sudden change in the ambient temperature and/or humidity, a user may unintentionally continue to touch a local position of the panel surface when operating a switch or the like located near the panel surface. This may be detected as a capacitance increased over the entire detection surface. In such a case, the conventional touch-type input device may erroneously detect touching of the entire panel surface.

It is an object of the present disclosure to provide a touch-type input device that is capable of correctly detecting touching.

A touch-type input device according to one aspect of the present disclosure includes a touch panel and a controller. The touch panel includes a panel surface. The panel surface includes a grid sensor pattern including drive electrodes and detection electrodes insulated from the drive electrodes, and intersections of the drive electrodes and the detection electrodes function as capacitors. The controller uses baselines respectively corresponding to the capacitors. The controller is configured to apply a drive signal to the drive electrodes and detect touching of the panel surface of the touch panel based on the baselines and changes in capacitances of the capacitors and update the baselines when the capacitances of the capacitors of the touch panel all remain within a predetermined capacitance range over a predetermined period.

In this configuration, when the capacitances of the capacitors all remain within the predetermined capacitance range over the predetermined period, this indicates that changes in temperature and/or humidity affect the entire detection surface of the touch panel. The controller updates the baseline in such a state. This allows the touch-type input device to correctly detect touching based on the updated baseline.

In the touch-type input device, the controller is configured to detect a difference in capacitance between one capacitor and a capacitor adjacent to the one capacitor for every one of the capacitors of the touch panel and determine that the capacitors of the touch panel all have a capacitance that is within the predetermined capacitance range when the difference in capacitance obtained for every one of the capacitors is smaller than or equal to a specific value.

This configuration, for every one of the capacitors, allows the controller to offset or reduce influence of a wiring length pattern length by referring to the difference in capacitance between two adjacent capacitors.

Each of the above aspects of the present disclosure provides a touch-type input device that is capable of correctly detecting touching.

Other aspects and advantages of the present disclosure will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a touch-type input device will now be described.

Figure 1:
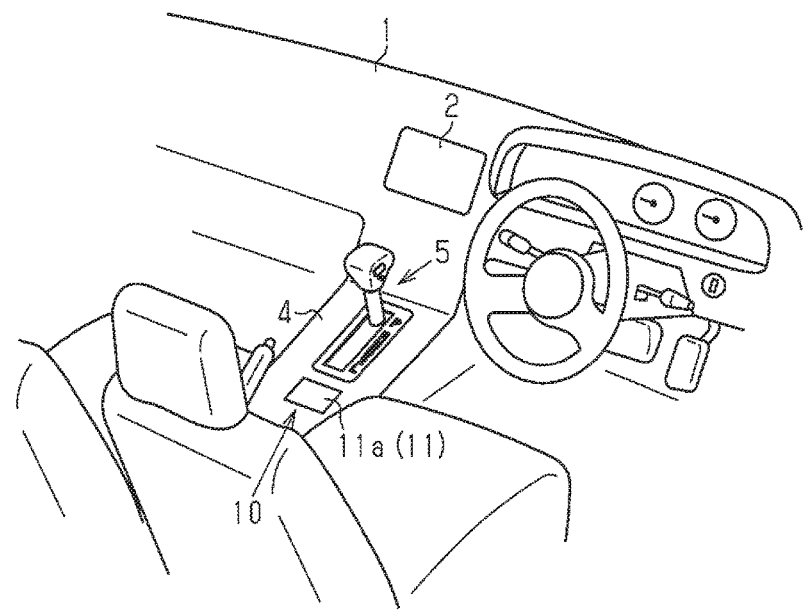
FIG. 1 is a perspective view showing the passenger compartment of a vehicle in which a touch-type input device is installed.

As shown in FIG. 1, a display 2 is arranged in a central portion (center cluster) of a dashboard 1. A touch-type input device 10 includes a touch panel 11. The touch panel 11 and a shift lever 5 are arranged on a center console 4. The outermost surface of the touch panel 11 detects a touch and defines a detection surface, namely, a panel surface 11a. The panel surface 11a is exposed from the center console 4. The touch-type input device 10 of the embodiment is installed in a vehicle. A user touches the touch panel 11 with a finger or a conductor such as a stylus to select or determine a desired functional item on the display 2 and have an in-vehicle device such as an air-conditioner or a car navigation system perform the desired operation. Although not intended to be restrictive, touching may include tapping, flicking, swiping, and the like of the detection surface 11a.

Figure 2:
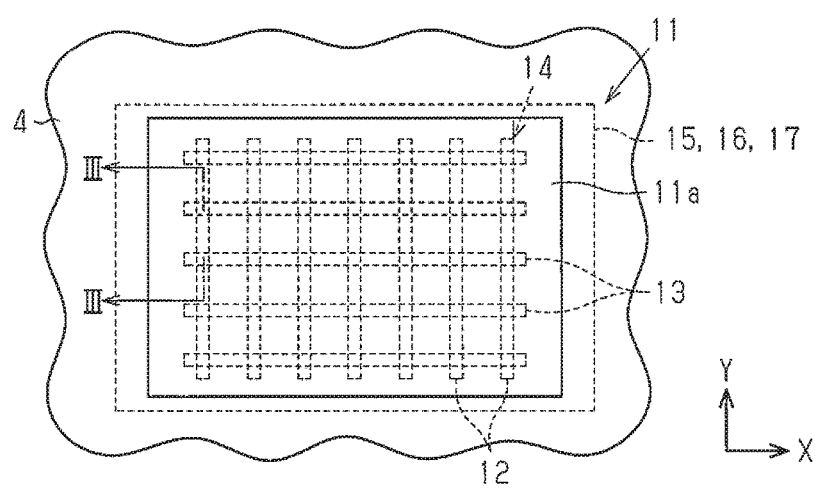
FIG. 2 is a plan view showing a touch panel.

As shown in FIG. 2, the touch panel 11 includes a grid sensor pattern 14 including drive electrodes 12 and detection electrodes 13, which are insulated from the drive electrodes 12. To facilitate understanding, only seven drive electrodes 12 and five detection electrodes 13 are shown in FIG. 2.

Figure 3:
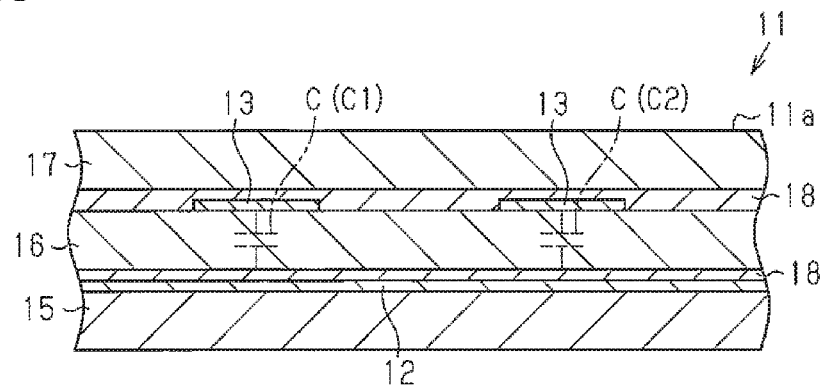
FIG. 3 is a cross-sectional view of the touch panel taken along line III-III in FIG. 2.

As shown in FIG. 3, the touch panel 11 may further include a drive substrate 15, a sensor substrate 16 overlapping the drive substrate 15, and a cover film 17 arranged on the sensor substrate 16. The drive electrodes 12 are arranged on the drive substrate 15. The detection electrodes 13 are arranged on the sensor substrate 16. The drive substrate 15, the sensor substrate 16, and the cover film 17 are formed from the same insulative material or from different insulative materials. Part of the upper surface of the cover film 17 functions as the detection surface 11a of the touch panel 11.

The drive electrodes 12 and the detection electrodes 13 may each be a strip of conductive material. The drive electrodes 12 and the detection electrodes 13 may be referred to as drive electrode strips and detection electrode strips, respectively. The drive electrodes 12 are arranged parallel to one another in the detection surface 11a and spaced apart from one another, for example, in a single direction (X direction). The detection electrodes 13 are parallel to one another in the detection surface 11a and spaced apart from one another, for example, in a direction orthogonal to the single direction (Y direction). The drive electrodes 12 and the detection electrodes 13 form the grid sensor pattern 14 in the detection surface 11a. The capacitors C (parasitic capacitances) are formed at the intersections of the drive electrodes 12 and the detection electrodes 13 as viewed from above (refer to broken lines in FIG. 3). Although not intended to be restrictive, the drive electrodes 12 and the detection electrodes 13 may be respectively fixed to the drive substrate 15 and the sensor substrate 16 by adhesives 18.

Figure 4:
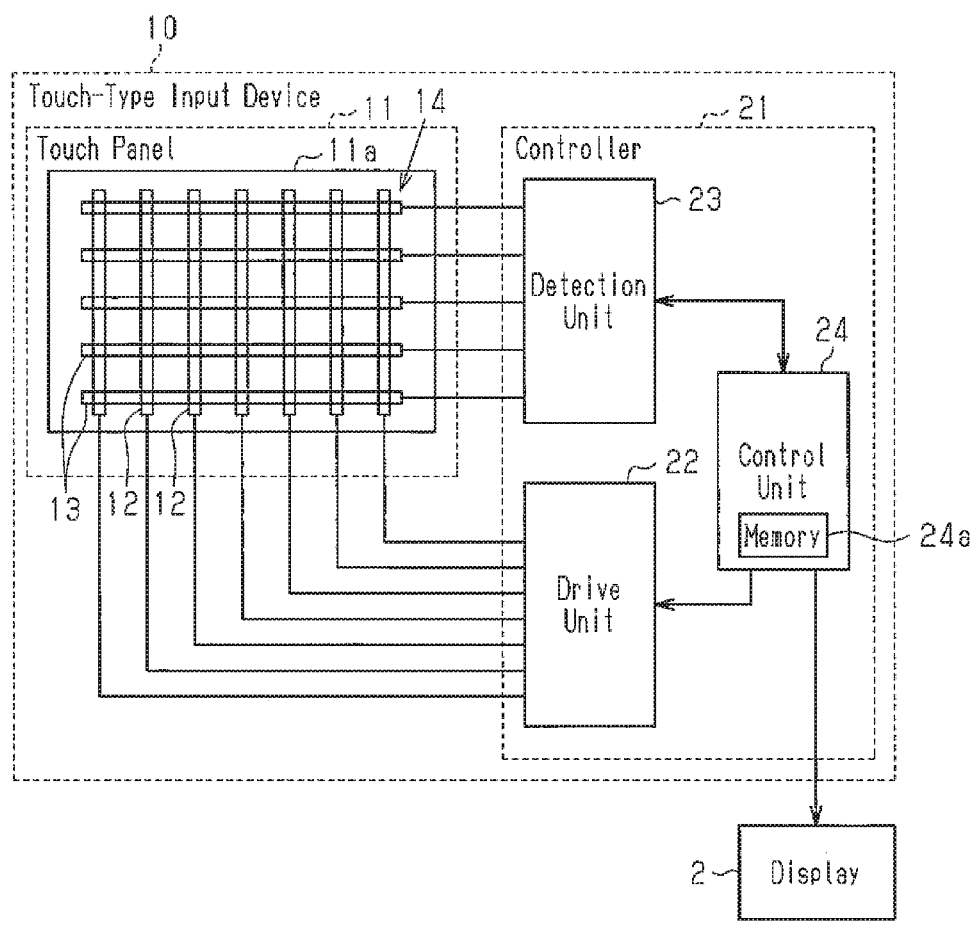
FIG. 4 is a block diagram showing the touch-type input device.

As shown in FIG. 4, the touch-type input device 10 further includes the touch panel 11 and a controller 21 that applies a drive signal (pulse signal) to the drive electrodes 12 of the sensor pattern 14 to detect touching. Although not intended to be restrictive, the controller 21 of the embodiment is of a mutual capacitive type that detects the touched position based on charging and discharging current of each capacitor C generated when the capacitance of each capacitor C changes.

The controller 21 may include a drive unit 22 connected to the drive electrodes 12, a detection unit 23 connected to the detection electrodes 13, and a control unit 24 that controls the drive unit 22 and the detection unit 23. The drive unit 22 generates a drive signal based on a control signal from the control unit 24 and applies the generated drive signal to one or more drive electrodes 12 that are selected based on the control signal. The detection unit 23 selects one or more detection electrodes 13 based on the control signal from the control unit 24 and receives charging and discharging current flowing to the detection electrodes 13 as an output signal in accordance with the drive signal applied to the drive electrodes 12. The detection unit 23 detects the capacitance of each capacitor C based on the output signal from each detection electrode 13 and outputs a detection signal that indicates the capacitance of each capacitor C to the control unit 24. The control unit 24 detects touching and a touched position (for example, two-dimensional coordinates) based on the detection signal and outputs the detection result to the display 2.

The control unit 24 may include a memory 24a or be connected to the memory 24a in an accessible manner. The memory 24a stores a predetermined baseline that is set for each of the capacitors C of the sensor pattern 14. The baseline is a capacitance value for distinguishing a capacitance that is dependent on changes in the environment such as temperature and/or humidity based on a capacitance resulting from a change caused by a touch. The baseline can be determined in advance by, for example, experiments, simulations, or experience. Although not intended to be restrictive, in the embodiment, an initial baseline corresponding to all the capacitors C is set to the capacitance value of zero. For example, the control unit 24 of the embodiment updates all the baselines when the condition described below is satisfied. When receiving a detection signal (detected capacitance) from the detection unit 23, the control unit 24 calculates the difference between the detected capacitance and the corresponding baseline (amount of change in capacitance). Then, when the difference exceeds the threshold described below, the control unit 24 determines that a position of the capacitor C corresponding to the detected capacitance was touched.

Although not intended to be restrictive, the drive unit 22, the detection unit 23, and the control unit 24 may be referred to as an electrode drive processor, a detection processor, and a control processor, respectively. The controller 21 may include a single processor that functions as the drive unit 22, the detection unit 23, and the control unit 24 and may include a memory or a storage medium that stores a computer-readable instruction executed by the processor. The memory or the storage device may be the same as the memory 24a that stores the baseline.

The operation of the touch-type input device 10 will now be described.

The transition of the touch-type input device 10 between different states will now be described with reference to FIG. 5. When the touch-type input device 10 is powered on, the controller 21 is activated to shift to an initial setting state (step S100). In the initial setting state, the controller 21 sets the detection unit 23, which includes a capacitance detection IC, and corrects a parasitic capacitance value. Correcting the parasitic capacitance means obtaining the baseline. That is, the control unit 24 has the memory 24A store, as a new baseline, a capacitance value indicated by a detection signal that is input from the detection unit 23 when activated. After obtaining the baseline, the control unit 24 shifts to a normal state (step S101) and waits for the detection of a touch. The baseline of the initial setting state may be set in the factory.

Generally, the capacitance of each capacitor C changes in accordance with the temperature. Thus, the control unit 24 updates the baseline to a baseline corresponding to temperature changes in a touch-off state (step S102) during which touching is not performed.

When detecting touching, the control unit 24 shifts from the touch-off state (step S102) to a touch-on state (step S103). In the touch-on state, the control unit 24 detects a touched position (for example, two-dimensional coordinates) and outputs the detection result to the display 2.

When the condition described below is satisfied, the control unit 24 shifts from the touch-on state (step S103) to the initial setting state (step S100).

A condition satisfaction determination process for updating a baseline will now be described with reference to FIG. 6. In the touch-on state (step S103), the control unit 24 performs this process to determine whether or not the baseline needs to be updated.

Figure 5:
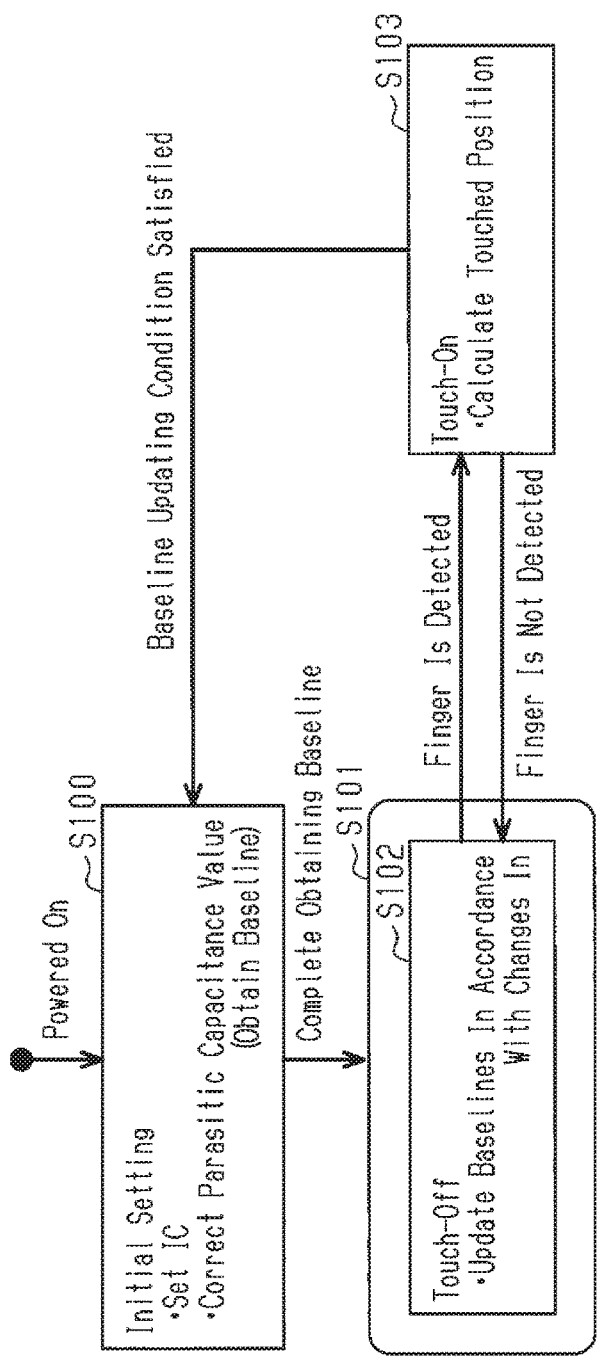
FIG. 5 is a diagram showing the transition of the touch-type input device between different states.
Figure 6:
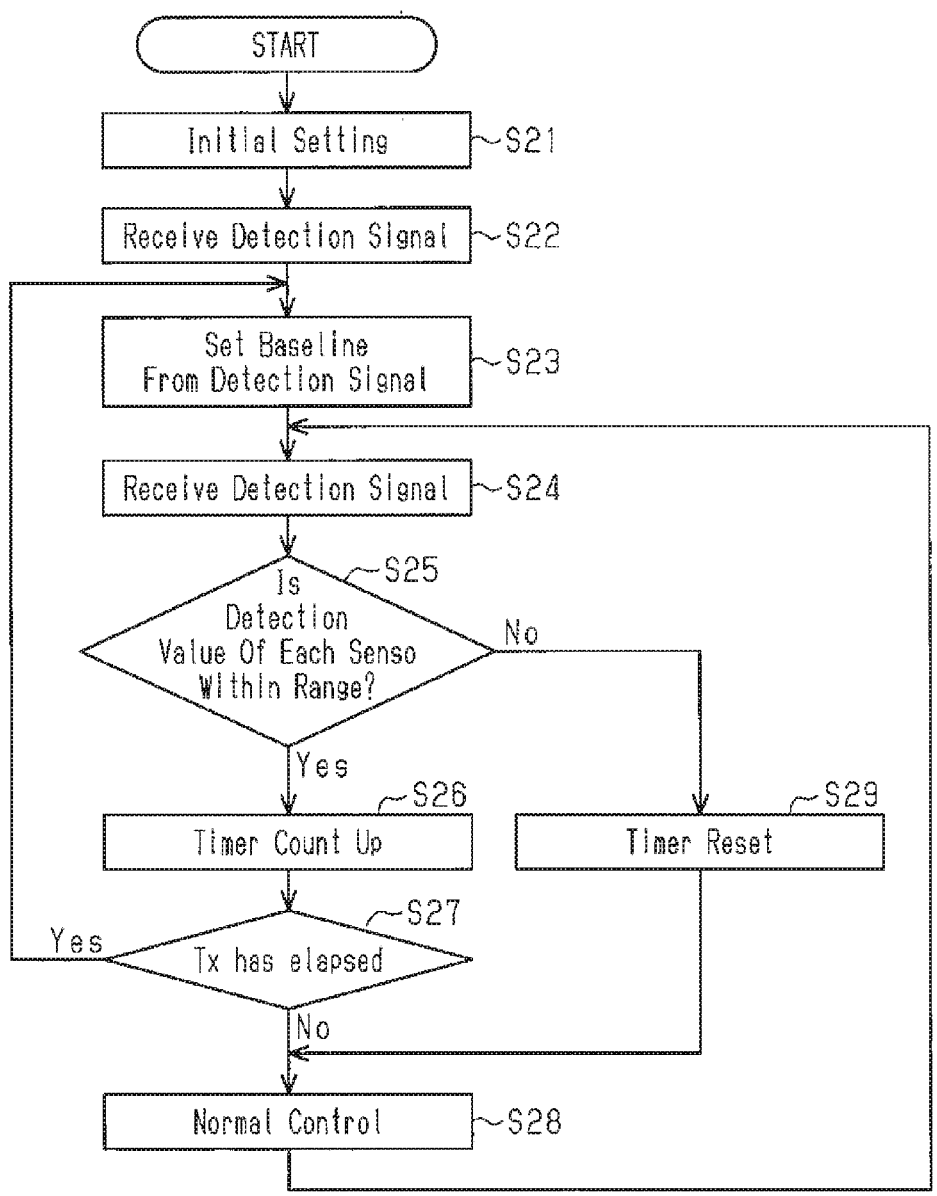
FIG. 6 is a flowchart showing a process performed by a control unit.

As shown in FIG. 6, the control unit 24 shifts to the initial setting state in step S21 (step S100 in FIG. 5). In step S22, the control unit 24 receives a detection signal from the detection unit 23. In step S23, the control unit 24 sets a baseline from the detection signal.

In step S24, the control unit 24 receives a new detection signal from the detection unit 23. The control unit 24 determines whether or not the detection value of each sensor (capacitance of each capacitor C) of the touch panel 11 is within a predetermined capacitance range (step S25). For example, for every one of the capacitors C, the control unit 24 detects a capacitance difference D between each capacitor (for example, first capacitor C1) and an adjacent capacitor (for example, second capacitor C2). Then, the control unit 24 determines that the capacitances of the capacitors C are all within the predetermined capacitance range when the capacitance differences D of the capacitors C are all smaller than or equal to a specific value Dx (step S25: Yes). The specific value Dx is smaller than a threshold value used to determine the detection of a touch, for example, smaller than or equal to one-half of the threshold value. When the user is not touching the detection surface 11a (when finger of user or stylus is not on detection surface 11a), the capacitances of the capacitors C are all within the predetermined capacitance range.

When the control unit 24 determines that every one of the capacitors C has a capacitance that is within the predetermined capacitance range (step S25: Yes), the control unit 24 performs a count up with a timer to determine whether or not such a state has continued over a predetermined period Tx (step S26). The predetermined period Tx corresponds to the time during which normal touching will most likely not be performed. In this example, the predetermined period Tx is twenty seconds. The control unit 24 determines whether or not the predetermined period Tx has elapsed when the capacitance of every one of the capacitors C is within the predetermined capacitance range (step S27).

When the control unit 24 undergoes normal control in step S28 and then determines that the capacitance of every one of the capacitors C has been within the predetermined capacitance range over the predetermined period Tx (step S27: YES), the conditions for updating the baseline are satisfied. Thus, the control unit 24 updates the baseline in step S23.

When the capacitance of any one of the capacitors C goes out of the predetermined capacitance range before the predetermined period Tx elapses (step S25: No), the control unit 24 resets the timer in step S29. In this case, the condition for updating the baseline is not satisfied. Thus, the control unit 24 does not update the baseline.

The updating of the baseline will now be described with reference to FIG. 7.

Figure 7A:
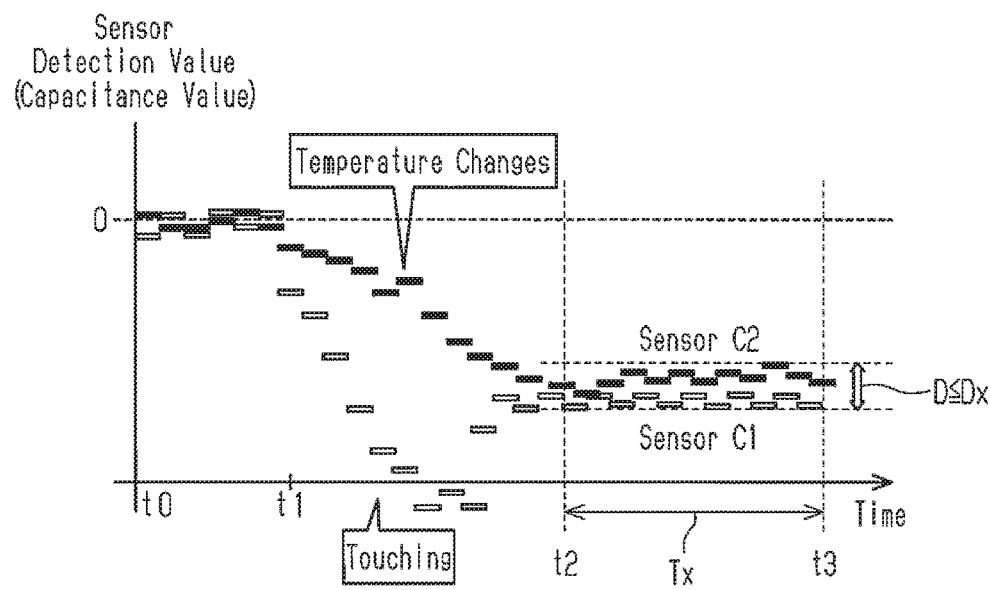
FIG. 7A is a time chart of an example when a condition is satisfied.

Among the sensors (capacitors C), FIG. 7A shows the detection values (capacitance values) of a first sensor C1 and a second sensor C2, which is adjacent to the first sensor C1, under the following situation. The ambient temperature is substantially constant (first temperature) during the period from time t0 to time t1. From time t1 to time t2, the temperature suddenly changes. At time t2, the temperature stops changing (at first temperature). From time t2 to time t3, the temperature remains substantially constant (at second temperature that differs from first temperature). When the temperature is changing (from time t1 to time t2), the user touches a portion of the touch panel 11 where the first capacitor C1 is formed with a finger and then separates the finger from the touch panel 11. Subsequently, the user does not touch the touch panel 11 until time t3.

Under this situation, the detection value difference D between the two sensors C1 and C2 exceeds the specific value Dx when the touch panel 11 is being touched with a finger at one of the sensors C1 and C2 (from time t1 to time t2), and the detection value difference D is smaller than or equal to the specific value Dx when the finger is separated from the touch panel 11 (time t2). Then, the detection value difference D remains smaller than or equal to the specific value Dx over the predetermined period Tx (from time t2 to time t3). Further, the controller 21 obtains the detection value difference D for every one of the sensors that is adjacent to the first sensor C1 or the second sensor C2. In this case, the detection value difference D in each pair of such adjacent sensors changes in the same manner as the detection value difference D between the first sensor C1 and the second sensor C2. In this manner, the controller 21 detects the detection value differences D between each sensor and every one of the adjacent sensors. When the detection value difference D exceeds the specific value Dx, the controller 21 determines that the touch panel 11 has been touched. Subsequently, the detection value differences D all remain within the specific value Dx over the predetermined period Tx. When the detection values of the sensors all continuously remain stable over the predetermined period Tx, this indicates that changes in the capacitance of every one of the sensors are caused only by changes in the ambient environment. The controller 21 (for example, control unit 24) determines that the detection surface 11a is not being touched (condition is satisfied) and updates the baseline.

Figure 7B:
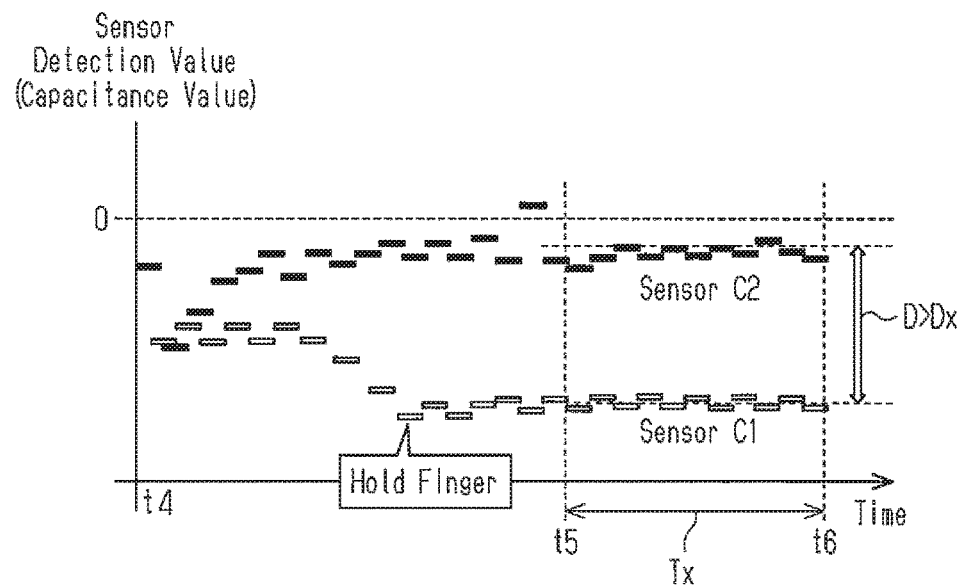
FIG. 7B is a time chart of an example when the condition is not satisfied.

Among the sensors (capacitors C), FIG. 7B shows the detection values (capacitance values) of the first sensor C1 and the second sensor C2, which is adjacent to the first sensor C1, under the following situation. The user touches the touch panel 11 with a finger at a position that corresponds to the first sensor C1 during the period from between time t4 to time t5. The user does not touch a position corresponding to the second sensor C2 with the finger. This state continues until time t6 over the predetermined period Tx. Under such a situation, the detection value difference D between the first sensor C1 and the second sensor C2 remains larger than the predetermined value Dx when the touch panel 11 is being touched with a finger. For example, when the touch panel 11 is touched with a finger only at a position corresponding to the first sensor C1, the detection value differences D between two adjacent sensors excluding the first sensor C1 are all smaller than or equal to the specific value Dx. That is, when the detection value differences D between a sensor and every one of the adjacent sensors are detected, only the detection value differences D of the first sensor C1 and its adjacent sensors are larger than the specific value Dx. When one or more differences D exceed the specified value Dx, this indicates that at least the first sensor C1 has detected a change caused by a reason other than those caused by the ambient environment. The control unit 24 determines that the detection surface 11a (for example, first sensor C1) is being touched with a finger (condition is satisfied) and thus does not update the baseline.

The embodiment has the advantages described below.

(1) When the capacitances of the capacitors C all remain within the predetermined capacitance range over the predetermined period Tx, this indicates that changes in temperature and/or humidity affect the entire detection surface 11a of the touch panel 11. The controller 21 updates the baseline in such a state. This allows the touch-type input device 10 to correctly detect touching based on the updated baseline.

(2) When the controller 21 performs detection of the difference in capacitance between a capacitor and an adjacent capacitor for every one of the capacitors C, the differences may all be smaller than or equal to the specific value Dx. In this case, the controller 21 determines that the capacitances of the capacitors C are all within the predetermined capacitance range. The influence of a wiring length pattern length is offset or reduced by referring to the difference in capacitance between two adjacent capacitors.

(3) The controller 21 automatically re-obtains a correct baseline when detecting that the user is not touching the detection surface 11a (finger of user is not on detection surface 11a). This improves convenience for the user.

The embodiment may be modified as follows.

When the difference between the maximum one and the minimum one of the capacitances of all the capacitors C obtained in the same measurement cycle is smaller than or equal to a predetermined dispersion upper limit value, the controller 21 may determine that the capacitances of the capacitors C are all within the predetermined capacitance range. Although not intended to be restrictive, the predetermined dispersion upper limit range may be, for example, one-half of the threshold value for determining the detection of a touch in the same manner as the specific value Dx of the embodiment.

A sensor detection value change that results from a temperature change may be opposite to a sensor detection value change resulting from a touch with a finger. When the sensor detection value changes in a manner opposite to a sensor detection value change that would occur when touched with a finger, the controller 21 may determine whether or not the baseline updating condition is satisfied in the touch-off state (step S102). It is preferred that the predetermined period Tx be shorter than the time for determining whether or not the sensor detection value has stabilized subsequent to the temperature change in the touch-off state (step S102). Such a configuration allows a correct baseline to be re-obtained quickly.

The controller 21 may independently update the baseline for each sensor and/or each sensor group (line or area).

In the touch-type input device 10 of the embodiment, the display 2 is separate from the touch panel 11. Another example of the touch-type input device 10 may be a touch-screen input device in which a transparent touch panel 11 overlaps the display 2.

The present disclosure encompasses the following implementations.

(Implementation 1) The specific value Dx of the touch-type input device is smaller than or equal to one-half of the threshold value for determining detection of a touch.

(Implementation 2) When the width of the maximum one and the minimum one of the capacitances of all the capacitors is smaller than or equal to the predetermined dispersion upper limit value, the controller of the touch-type input device determines that the capacitances of the capacitors C are all within the predetermined range.

(Implementation 3) The dispersion upper limit value of the touch-type input device is smaller than or equal to one-half of the threshold value for determining detection of a touch.

(Implementation 4) The controller includes a memory that stores the predetermined capacitance range and the predetermined period.

(Implementation 5) The baseline is a capacitance value for distinguishing the capacitance resulting from touching from the capacitance resulting from the ambient environment.

It should be apparent to those skilled in the art that the present invention may be embodied in many other specific forms without departing from the scope of the invention. For example, one or more of the components may be omitted from the components described in the embodiments (or one or more aspects thereof). Further, component(s) in different embodiments may be appropriately combined.

What is claimed is:

1. A touch-type input device comprising:
    a touch panel including a panel surface, wherein the panel surface includes a grid sensor pattern including drive electrodes and detection electrodes insulated from the drive electrodes, and intersections of the drive electrodes and the detection electrodes function as capacitors; and
    a controller configured to:
    apply a drive signal to the drive electrodes to detect touching of the panel surface of the touch panel based on baseline capacitive values and changes in capacitances of the capacitors;
    detect a difference in capacitance between one capacitor and a capacitor directly adjacent to the one capacitor for every one of the capacitors of the touch panel;
    determine that the capacitors of the touch panel all have a capacitance value that is within a predetermined capacitance range when the difference in capacitance obtained for every one of the capacitors is smaller than or equal to a specific value, the specific value being outside of a threshold capacitive value for detecting the touching of the panel surface; and
    update the baseline capacitive value when the capacitances of all of the capacitors of the touch panel are determined to remain within the predetermined capacitance range over a predetermined time period.

2. The touch-type input device according to claim 1, wherein
    during the predetermined period, said drive signal is continuously applied to the drive electrodes.

3. The touch-type input device according to claim 1, wherein
the specific value is smaller than or equal to one-half of a threshold value for detecting the touching of the panel surface.

4. The touch-type input device according to claim 1, wherein
when a width of a maximum one and a minimum one of the capacitances of all the capacitors is smaller than or equal to a predetermined dispersion upper limit value of the touch-type input device, the controller determines that the capacitances of the capacitors are all within the predetermined range.

5. The touch-type input device according to claim 4, wherein
the predetermined dispersion upper limit value of the touch-type input device is smaller than or equal to one-half of the threshold capacitive value for detecting the touching of the panel surface.

6. The touch-type input device according to claim 1, wherein
the controller includes a memory that stores the predetermined capacitance range and the predetermined time period.

7. The touch-type input device according to claim 1, wherein
the baseline capacitive values are capacitance values for distinguishing a capacitance resulting from the detected touching of the panel surface from a capacitance resulting from an ambient environment.

* * * * *